US012806916B2

(12) United States Patent
Asai

(10) Patent No.: US 12,806,916 B2
(45) Date of Patent: Nov. 24, 2026

(54) PRINTING APPARATUS AND PRINTING METHOD

(71) Applicant: SCREEN Holdings Co., Ltd., Kyoto (JP)

(72) Inventor: Hiroshi Asai, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 153 days.

(21) Appl. No.: 18/818,848

(22) Filed: Aug. 29, 2024

(65) Prior Publication Data

US 2025/0074070 A1 Mar. 6, 2025

(30) Foreign Application Priority Data

Aug. 30, 2023 (JP) ................................ 2023-139738

(51) Int. Cl.
*B41J 2/21* (2006.01)
*B41M 3/00* (2006.01)
*G06K 15/02* (2006.01)

(52) U.S. Cl.
CPC ........... *B41J 2/2132* (2013.01); *B41J 2/2103* (2013.01); *B41J 2/2121* (2013.01); *B41M 3/008* (2013.01); *G06K 15/1869* (2013.01); *G06K 15/1881* (2013.01); *G06K 2215/101* (2013.01)

(58) Field of Classification Search
CPC ...... B41J 2/2132; B41J 2/2103; B41J 2/2121; B41J 2/2117; B41J 2/2146; B41J 2/515; B41J 2/1433; B41J 2/162; B41J 2002/14475; B41M 3/008; G06K 15/1869; G06K 15/1881; G06K 2215/101
See application file for complete search history.

(56) References Cited

U.S. PATENT DOCUMENTS

| | | | |
|---|---|---|---|
| 2002/0051024 | A1 | 5/2002 | Naoi |
| 2020/0023648 | A1 | 1/2020 | Gotou et al. |
| 2020/0276827 | A1 | 9/2020 | Ishida |

FOREIGN PATENT DOCUMENTS

| | | | |
|---|---|---|---|
| JP | 5754537 | B2 | 7/2015 |
| JP | 2022-081707 | A | 6/2022 |

OTHER PUBLICATIONS

Extended European Search Report received in corresponding EP Application No. 24195335.5, dated Jan. 3, 2025.

*Primary Examiner* — Kristal Feggins
(74) *Attorney, Agent, or Firm* — Rimon P.C.

(57) ABSTRACT

Each of the discharge head 3*wu*, 3*wd* discharges the ink dots of white to the web 10. The discharge heads 3*wu*, 3*wd* are controlled to share the discharge of the white ink for the web 10. As a result of such a control, the ink dot discharged to the web 10 from the discharge head 3*wd* is interposed between two ink dots successively discharged to the web 10 from the nozzle 31 of the discharge head 3*wu* in the X direction. The ink dot discharged to the web 10 from the discharge head 3*wu* is interposed between two ink dots successively discharged to the web 10 from the nozzle 31 of the discharge head 3*wd* in the X direction. That is, each of the discharge head 3*wu* and the head 3*wd* only has to be able to continuously discharge the ink in the cycle, which is twice the cycle Tcy, and should not necessarily be able to continuously discharge the ink in a short time.

10 Claims, 10 Drawing Sheets

F I G. 3 C

| DRIVE SIGNAL S | DISCHARGE QUANTITY OF COLOR INK | DISCHARGE QUANTITY OF WHITE INK | MAGNITUDE RELATIONSHIP |
|---|---|---|---|
| DRIVE SIGNAL Ss | Qsc | Qsw | Qsc<Qsw |
| DRIVE SIGNAL Sm | Qmc | Qmw | Qmc<Qmw |
| DRIVE SIGNAL Sl | Qlc | Qlw | Qlc<Qlw |
| MAGNITUDE RELATIONSHIP | Qsc<Qmc<Qlc | Qsw<Qmw<Qlw | |

PRINTING APPARATUS AND PRINTING METHOD

CROSS REFERENCE TO RELATED APPLICATION

The disclosure of Japanese Patent Application No. 2023-139738 filed on Aug. 30, 2023 including specification, drawings and claims is incorporated herein by reference in its entirety.

BACKGROUND OF THE INVENTION

1. Field of the Invention

This invention relates to a technique for printing an image on a printing medium by discharging an ink from nozzles by an ink-jet method.

2. Description of the Related Art

A color image can be printed on a printing medium by discharging an ink of a color such as cyan, magenta, yellow or black to the printing medium from nozzles by an ink-jet method. Further, a white background image can be printed on the printing medium by discharging a white ink to the printing medium from nozzles.

SUMMARY OF THE INVENTION

To improve contrast (in other words, visibility of a color image) between the color image and a background image, a large quantity of an ink of a specific color (white) used for the background image needs to be discharged without leaving any gaps. However, the quantity of the ink dischargeable per unit time is restricted according to the performance of a discharge unit for discharging the ink. Thus, it has been necessary to prepare a high-performance discharge unit to discharge a large quantity of an ink of a specific color.

This invention was developed in view of the above problem and aims to enable a large quantity of an ink of a specific color to be discharged to a printing medium without requiring a high-performance discharge unit.

A printing apparatus according to the invention, comprises: a conveyor conveying a printing medium in a conveying direction; a first discharge unit including a plurality of first nozzles arrayed at a predetermined array pitch in an array direction intersecting the conveying direction, the first discharge unit forming an ink dot on the printing medium by an ink discharged from the first nozzle; a second discharge unit including a plurality of second nozzles arrayed at the array pitch in the array direction, the second discharge unit forming an ink dot on the printing medium by an ink discharged from the second nozzle; a third discharge unit including a plurality of third nozzles arrayed at the array pitch in the array direction, the third discharge unit forming an ink dot on the printing medium by an ink discharged from the third nozzle; and a control unit controlling the first discharge unit, the second discharge unit and the third discharge unit, the first discharge unit, the second discharge unit and the third discharge unit being arrayed in the conveying direction, a color of the ink discharged from the second nozzles by the second discharge unit and a color of the ink discharged from the third nozzles by the third discharge unit being the same specific color, a color of the ink discharged from the first nozzles by the first discharge unit being a color different from the specific color, and the control unit controlling a timing at which each of the second discharge unit and the third discharge unit discharges an ink droplet so that one ink dot formed on the printing medium by the ink discharged from the third nozzle is interposed between two ink dots formed on the printing medium by the ink continuously discharged from the second nozzle and one ink dot formed on the printing medium by the ink discharged from the second nozzle is interposed between two ink dots formed on the printing medium by the ink discharged from the third nozzle in the conveying direction.

A printing method according to the invention, comprises: conveying a printing medium in a conveying direction; controlling a timing at which an ink is discharged to the printing medium from a first nozzle by a first discharge unit including a plurality of first nozzles arrayed at a predetermined array pitch in an array direction intersecting the conveying direction; controlling a timing at which an ink is discharged to the printing medium from a second nozzle by a second discharge unit including a plurality of second nozzles arrayed at the predetermined array pitch in the array direction; and controlling ink a timing at which an ink is discharged to the printing medium from a third nozzle by a third discharge unit including a plurality of third nozzles arrayed at the predetermined array pitch in the array direction; the first discharge unit, the second discharge unit and the third discharge unit being arrayed in the conveying direction, a color of the ink discharged from the second nozzles by the second discharge unit and a color of the ink discharged from the third nozzles by the third discharge unit being the same specific color, a color of the ink discharged from the first nozzles by the first discharge unit being a color different from the specific color, and the timing, at which each of the second discharge unit and the third discharge unit discharges the ink, being controlled so that one ink dot formed on the printing medium by the ink discharged from the third nozzle is interposed between two ink dots formed on the printing medium by the ink continuously discharged from the second nozzle and one ink dot formed on the printing medium by the ink discharged from the second nozzle is interposed between two ink dots formed on the printing medium by the ink continuously discharged from the third nozzle in the conveying direction.

According to the invention (printing apparatus and printing method) thus configured, each of the second discharge unit for discharging the ink from the second nozzles and the third discharge unit for discharging the ink from the third nozzles discharges the ink of the specific color to the printing medium. Particularly, the second and third discharge units share the discharge of the ink of the specific color to the printing medium. That is, a timing at which each of the second and third discharge units discharges the ink is controlled so that one ink dot formed on the printing medium by the ink discharged to the printing medium from the third nozzle is interposed between two ink dots formed on the printing medium by the ink continuously discharged to the printing medium from the second nozzle and one ink dot formed on the printing medium by the ink discharged to the printing medium from the second nozzle is interposed between two ink dots formed on the printing medium by the ink continuously discharged to the printing medium from the third nozzle in the conveying direction. Thus, each of the second and third discharge units should not be necessarily able to continuously discharge the ink in a short time. As a result, a large quantity of the ink of the specific color can be discharged to the printing medium without requiring a high-performance discharge unit.

As described above, according to the invention, a large quantity of the ink of the specific color can be discharged to the printing medium without requiring a high-performance discharge unit.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 3C is a table schematically showing a relationship of the quantity of the ink droplets of each color.

DETAILED DESCRIPTION OF THE PREFFERED EMBODIMENTS

Figure 1A:
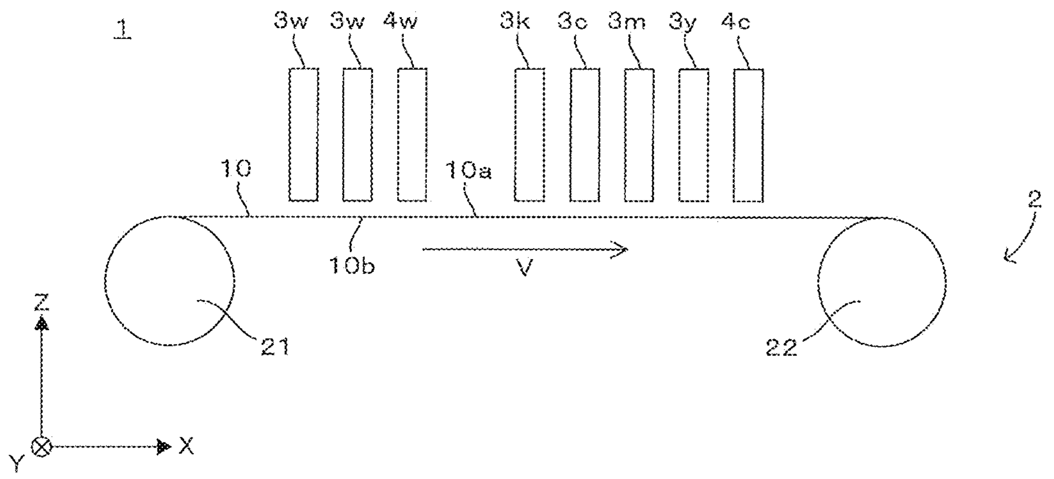
FIG. 1A is a diagram schematically showing a first example of a basic configuration of a printing apparatus according to the invention.
Figure 1B:
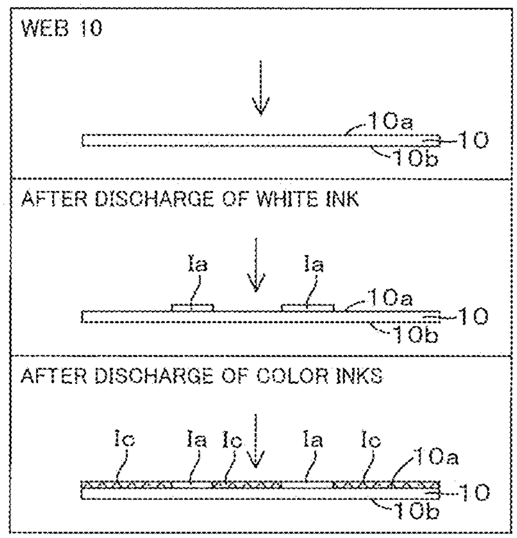
FIG. 1B is a diagram schematically showing printing performed in the printing apparatus of FIG. 1A.

FIG. 1A is a diagram schematically showing a first example of a basic configuration of a printing apparatus according to the invention, and FIG. 1B is a diagram schematically showing printing performed in the printing apparatus of FIG. 1A. The printing apparatus 1 prints an image on a web 10, which is a printing medium, by discharging inks to the web 10 by an ink-jet method. A web 10 made of a transparent film or a web 10 made of an opaque film or paper can be, for example, used as the web 10. Note that, out of both surfaces of the web 10, a surface visually recognized by a person is defined as a front surface 10*a* and a surface opposite to the front surface 10*a* is defined as a back surface 10*b* (field of "Web 10" of FIG. 1). Note that, in FIG. 1A and subsequent figures, an X direction, which is a conveying direction of the web 10 in the printing apparatus 1, a Y direction, which is a width direction of the web 10 and a Z direction, which is a vertical direction, are shown as appropriate. Here, the X direction and the Y direction are orthogonal to each other. Further, a visual recognition direction by a person is indicated by an arrow in FIG. 1B.

The printing apparatus 1 is provided with a conveyor 2 for conveying the web 10. The conveyor 2 includes a feeding roller 21 feeding the web 10 and a winding roller 22 winding the web 10 fed from the feeding roller 21, and the web 10 is conveyed from the feeding roller 21 to the winding roller 22 in a roll-to-roll manner in the X direction. This conveyor 2 conveys the web 10 at a predetermined conveying speed V while causing the front surface 10A of the web 10 to face up. Note that the conveyor 2 is schematically shown in FIG. 1A and includes unillustrated other rollers between the feeding roller 21 and the winding roller 22. Further, a conveyance path of the web 10 is appropriately curved according to the winding of the web 10 on the other rollers.

Further, the printing apparatus 1 is provided with two discharge heads 3*w* arrayed in the X direction, which is the conveying direction of the web 10, one discharge head 3*k*, one discharge head 3*c*, one discharge head 3*m* and one discharge head 3*y*. That is, a number (two) of the discharge heads 3*w* is more than a number (one) of each of the discharge heads 3*k*, 3*c*, 3*m* and 3*y*.

Each of the two discharge heads 3*w* faces the front surface 10*a* of the web 10 from above and discharges a white ink to the front surface 10*a*. The one discharge head 3*k* faces the front surface 10*a* of the web 10 from above on a side downstream of the two discharge heads 3*w* in the X direction and discharges a black ink to the front surface 10*a*. The one discharge head 3*c* faces the front surface 10*a* of the web 10 from above on a side downstream of the one discharge head 3*k* in the X direction and discharges a cyan ink to the front surface 10*a*. The one discharge head 3*m* faces the front surface 10*a* of the web 10 from above on a side downstream of the one discharge head 3*c* in the X direction and discharges a magenta ink to the front surface 10*a*. The one discharge head 3*y* faces the front surface 10*a* of the web 10 from above on a side downstream of the one discharge head 3*m* in the X direction and discharges a yellow ink to the front surface 10*a*.

The two discharge heads 3*w* print a background image Ib on the front surface 10*a* by discharging the white ink to the front surface 10*a* of the web 10 being conveyed at the conveying speed V by the conveyor 2 (field of "After Discharge of White Ink" of FIG. 1). Note that a specific operation of the two discharge heads 3*w* to print the background image Ib is described later. The front surface 10*a* of the web 10 printed with the background image Ib is conveyed toward the discharge heads 3*k*, 3*c*, 3*m* and 3*y* on the side downstream of the two discharge heads 3*w* in the X direction. Then, the discharge heads 3*k*, 3*c*, 3*m* and 3*y* print a color image Ic (design image) on the front surface 10*a* by respectively discharging the inks of black, cyan, magenta and yellow (color inks) to the front surface 10*a* of the web 10 being conveyed at the conveying speed V (field of "After Discharge of Color Inks" of FIG. 1).

Further, the printing apparatus 1 is provided with a white fixer 4*w* and a color fixer 4*c*. The white fixer 4*w* is provided downstream of the two discharge heads 3*w* in the X direction and located between the discharge head 3*w* and the discharge head 3*k*. This white fixer 4*w* performs a processing of fixing the white ink discharged from the two discharge heads 3*w* to the front surface 10*a* of the web 10 to the front surface 10*a*. The color fixer 4*c* is provided downstream of the discharge heads 3*k*, 3*c*, 3*m* and 3*y* in the X direction. This color fixer 4*c* performs a processing of fixing the black, cyan, magenta and yellow inks discharged from the discharge heads 3*k*, 3*c*, 3*m* and 3*y* to the front surface 10*a* of the web 10 to the front surface 10*a*. Note that, if the inks are water-based inks, the white fixer 4*w* and the color fixer 4*c* perform a processing of heating and drying the inks. If the inks are UV (Ultra Violet) inks, the white fixer 4*w* and the color fixer 4*c* perform a processing of curing the inks by irradiating UV light to the inks.

Figure 2A:
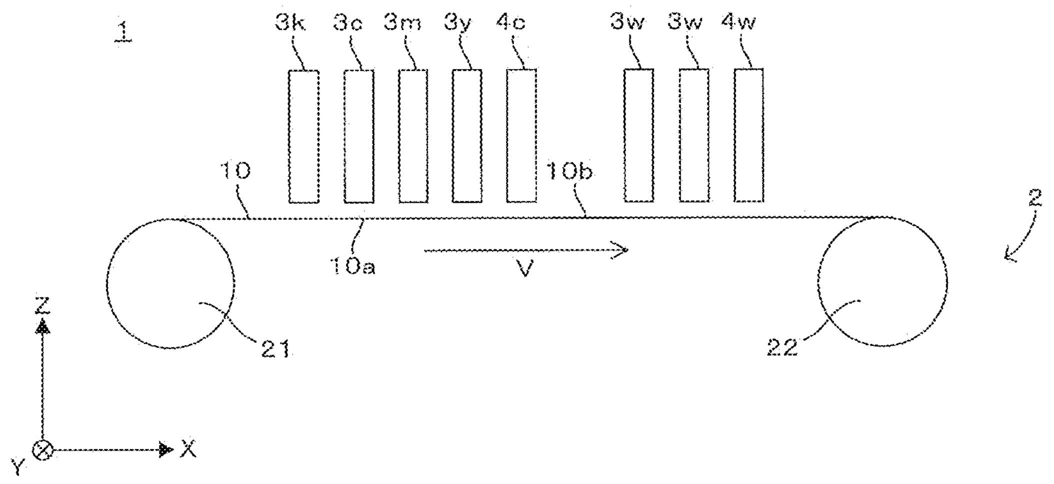
FIG. 2A is a diagram schematically showing a second example of the basic configuration of the printing apparatus according to the invention.
Figure 2B:
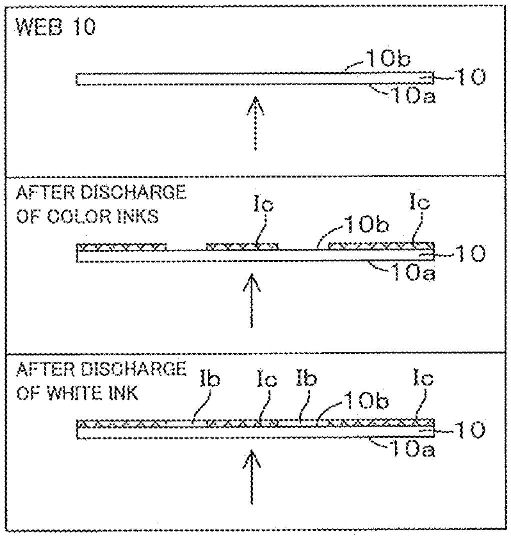
FIG. 2B is a diagram schematically showing printing performed in the printing apparatus of FIG. 2A.

FIG. 2A is a diagram schematically showing a second example of the basic configuration of the printing apparatus according to the invention, and FIG. 2B is a diagram schematically showing printing performed in the printing apparatus of FIG. 2A. The second example differs from the first example in that a white ink is discharged after color inks are discharged to the back surface 10*b* of the web 10. Thus, description is centered on the point of difference from the first example here and common points are not described by using equivalent reference signs. Note that a web 10 made of a transparent film is used as the web 10 in the second example. Further, a direction of visual recognition by a person is indicated by an arrow in FIG. 2B.

A conveyor 2 of the second example conveys the web 10 at a predetermined conveying speed V while causing the back surface 10*b* of the web 10 to face up. In contrast, discharge heads 3*k*, 3*c*, 3*m* and 3*y* print a color image Ic (design image) on the back surface 10*b* by respectively discharging inks of black, cyan, magenta and yellow (color inks) to the back surface 10*b* of the web 10 being conveyed at the conveying speed V by the conveyor 2 (field of "After Discharge of Color Inks" of FIG. 2B). The back surface 10*b* of the web 10 printed with the color image Ic is conveyed toward two discharge heads 3*w* downstream of the discharge heads 3*k*, 3*c*, 3*m* and 3*y* in the X direction. Then, the two discharge heads 3*w* print a background image Ib on the back surface 10*b* by discharging a white ink to the back surface 10*b* of the web 10 being conveyed (field of "After Discharge of White Ink" of FIG. 2B).

Further, a color fixer 4*c* is provided downstream of the discharge heads 3*k*, 3*c*, 3*m* and 3*y* in the X direction and performs a processing of fixing the inks of black, cyan, magenta and yellow discharged to the back surface 10*b* of the web 10 from the discharge heads 3*k*, 3*c*, 3*m* and 3*y* to the back surface 10*b*. A white fixer 4*w* is provided downstream of the two discharge heads 3*w* in the X direction and performs a processing of fixing the white ink discharged to the back surface 10*b* of the web 10 from the discharge heads 3*w* to the back surface 10*b*.

Figure 3A:
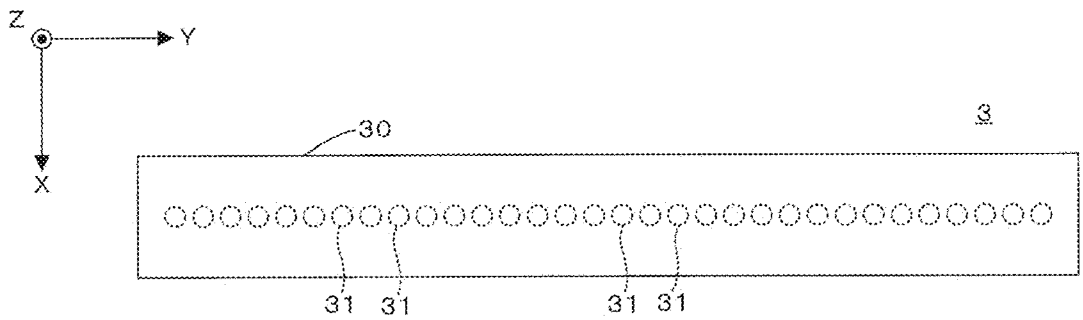
FIG. 3A is a plan view schematically showing a basic configuration of the discharge head.
Figure 3B:
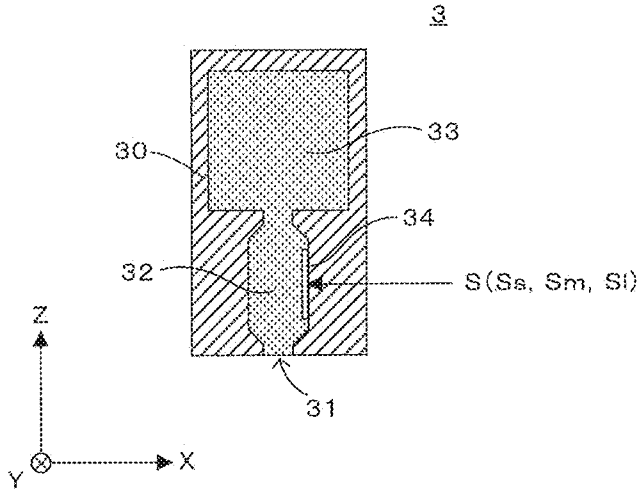
FIG. 3B is a section schematically showing the basic configuration of the discharge head.

FIG. 3A is a plan view schematically showing a basic configuration of the discharge head, and FIG. 3B is a section schematically showing the basic configuration of the discharge head. Note that since the discharge heads 3*w*, 3*k*, 3*c*, 3*m* and 3*y* respectively have a common configuration, these are referred to as the discharge heads 3 without being distinguished here.

The discharge head 3 includes a housing 30 and a plurality of nozzles 31 open in the bottom surface of the housing 30. Note that the nozzles 31 are shown by broken lines through the housing 30 in FIG. 3A. The plurality of nozzles 31 are arrayed in the Y direction and open at mutually different positions in the Y direction. Note that an array mode of the nozzles 31 is not limited to the linear array as shown in FIG. 3A, but may be a staggered array.

A plurality of cavities 32 respectively communicating with the plurality of nozzles 31 and an ink supply chamber 33 communicating with the plurality of cavities 32 are provided inside the housing 30, and the ink supplied from the ink supply chamber 33 is stored in the cavities 32. Further, a piezoelectric element 34 is provided in each cavity 32, and the piezoelectric element 34 varies a pressure of the ink in the cavity 32 by being displaced according to a drive signal S (electrical signal). By this pressure variation, the ink is pushed out from the cavity 32 and discharged as ink droplets from the nozzle 31 communicating with this cavity 32. In this way, the ink droplets discharged from the nozzle 31 land on the web 10 and form ink dots on the web 10.

There are three types of drive signals Ss, Sm and S1 as the drive signals S for driving the piezoelectric element 34. The drive signal Sm has a larger amplitude than the drive signal Ss, and a quantity Qm of the ink droplets discharged by driving the piezoelectric element 34 by the drive signal Sm is more than a quantity Qs of the ink droplets discharged by driving the piezoelectric element 34 by the drive signal Ss. Further, the drive signal S1 has a larger amplitude than the drive signal Sm, and a quantity Q1 of the ink droplets discharged by driving the piezoelectric element 34 by the drive signal S1 is more than the quantity Qm of the ink droplets discharged by driving the piezoelectric element 34 by the drive signal Sm.

The above is the common basic configuration of the discharge heads 3*w*, 3*k*, 3*c*, 3*m* and 3*y*. On the other hand, the discharge heads 3*w* are different from the discharge heads 3*k*, 3*c*, 3*m* and 3*y* in the volume of the cavity 32. That is, the volume of the cavity 32 of the discharge head 3*w* is larger than that of the cavity 32 of each of the discharge heads 3*k*, 3*c*, 3*m* and 3*y*. Therefore, the discharge head 3*w* can form ink dots by discharging a larger quantity of the ink at once as compared to the discharge heads 3*k*, 3*c*, 3*m* and 3*y*.

Thus, there are magnitude relationships shown in FIG. 3C between the quantity of the ink droplets of the white ink discharged from the nozzle 31 by the discharge head 3*w* and the quantity of the ink droplets of the color ink (ink of black, cyan, magenta or yellow) discharged from the nozzle 31 by the discharge head 3*k*, 3*c*, 3*m* or 3*y*. Here, FIG. 3C is a table schematically showing a relationship of the quantity of the ink droplets of each color. That is, the quantity Qs (Qsw) of the ink droplets discharged by the nozzle 31 of the discharge head 3*w* is more than the quantity Qs (Qsc) of the ink droplets discharged by the nozzle 31 of the discharge head 3*k*, 3*c*, 3*m* or 3*y*, the quantity Qm (Qmw) of the ink droplets discharged by the nozzle 31 of the discharge head 3*w* is more than the quantity Qm (Qmc) of the ink droplets discharged by the nozzle 31 of the discharge head 3*k*, 3*c*, 3*m* or 3*y*, and the quantity Q1 (Q1*w*) of the ink droplets discharged by the nozzle 31 of the discharge head 3*w* is more than the quantity Q1 (Q1*c*) of the ink droplets discharged by the nozzle 31 of the discharge head 3*k*, 3*c*, 3*m* or 3*y*.

Here, the ink of black, cyan, magenta or yellow is generically called the color ink and the quantity of the color ink is denoted by Qsc, Qmc or Q1*c*. However, this does not indicate that the quantity of the ink droplets of black, cyan, magenta or yellow is equal and the quantities of the ink droplets may be different among these colors.

Figure 4:
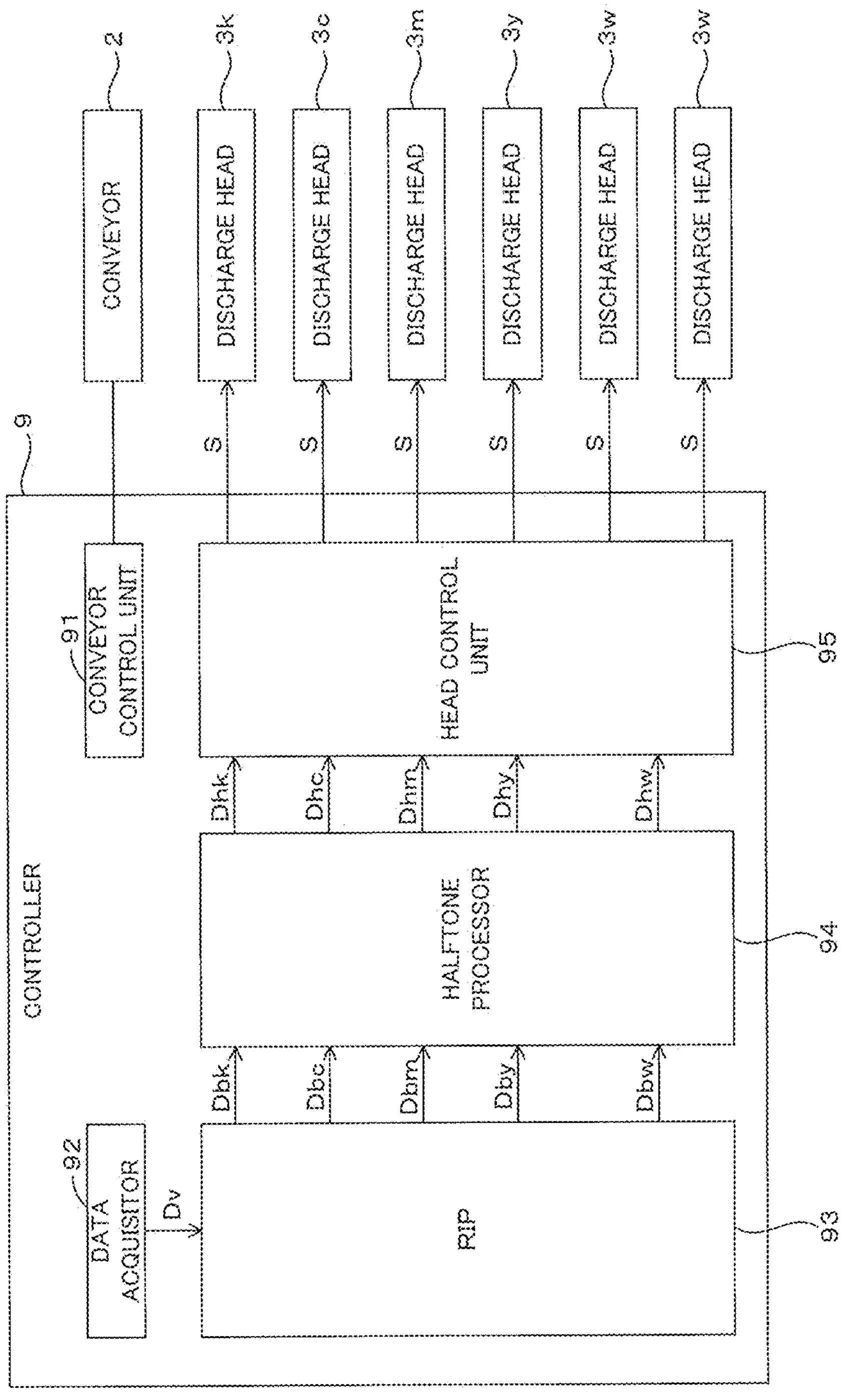
FIG. 4 is a diagram schematically showing an electrical configuration of the printing apparatus.

FIG. 4 is a diagram schematically showing an electrical configuration of the printing apparatus. The printing apparatus 1 is provided with a controller 9 for integrally controlling the printing apparatus 1. The controller 9 is, for example, formed by a processor such as a CPU (Central Processing Unit), a FPGA (Field Programmable Gate Array) or the like. The controller 9 includes a conveyor control unit 91 for controlling the conveyor 2. The conveyor control unit 91 controls the conveyor 2 so that the web 10 is conveyed at the conveying speed V in the X direction. Further, the controller 9 includes a data acquisitor 92, a RIP (Raster Image Processor) 93, a halftone processor 94 and a head control unit 95.

The data acquisitor 92 acquires vector data Dv (submitted data) representing an image to be printed by the printing apparatus 1, for example, from an external computer or the like. The RIP 93 converts the vector data Dv into bit map data Dbk, Dbc, Dvm, Dby and Dbw of the respective colors by rasterizing the vector data Dv received from the data acquisitor 92. Here, the bit map data Dbk is bit map data of black, the bit map data Dbc is bit map data of cyan, the bit map data Dbm is bit map data of magenta, the bit map data Dby is bit map data of yellow and the bit map data Dbw is bit map data of white.

The halftone processor 94 performs a halftone processing of binarizing a gradation value of each pixel represented by the bit map data generated by the RIP 93 for each of the bit map data Dbk, Dbc, Dvm, Dby and Dbw. By this halftone processing, the bit map data Dbk is converted into a halftone image data Dhk of black, the bit map data Dbc is converted into a halftone image data Dhc of cyan, the bit map data Dbm is converted into a halftone image data Dhm of magenta, the bit map data Dby is converted into a halftone image data Dhy of yellow, and the bit map data Dbw is converted into a halftone image data Dhw of white.

The head control unit 95 controls each of the plurality of piezoelectric elements 34 of the discharge head 3 based on the halftone image data Dhk, Dhc, Dhm, Dhy or Dhw. The piezoelectric element 34 is controlled by giving the drive signal S to the piezoelectric element 34 and driving the piezoelectric element 34 by the drive signal S. As described above, there are three types of the drive signals Ss, Sm and S1 as the drive signals S. Accordingly, the head control unit 95 determines the drive signal S to be given to each piezoelectric element 34 of the discharge head 3, out of the drive signals Ss, Sm and S1, based on the halftone image data Dhk, Dhc, Dhm, Dhy or Dhw.

That is, the drive signal S to be given to each piezoelectric element 34 of the discharge head **3*k* is determined based on the halftone image data Dhk, and the piezoelectric element 34 of the discharge head 3*k* is driven by this drive signal S. The drive signal S to be given to each piezoelectric element 34 of the discharge head 3*c* is determined based on the halftone image data Dhc, and the piezoelectric element 34 of the discharge head 3*c* is driven by this drive signal S. The drive signal S to be given to each piezoelectric element 34 of the discharge head 3*m* is determined based on the halftone image data Dhm, and the piezoelectric element 34 of the discharge head 3*m* is driven by this drive signal S. The drive signal S to be given to each piezoelectric element 34 of the discharge head 3*y* is determined based on the halftone image data Dhy, and the piezoelectric element 34 of the discharge head 3*y*** is driven by this drive signal S.

Similarly, the drive signal S to be given to each piezoelectric element 34 of the discharge head **3*w* is determined based on the halftone image data Dhw, and the piezoelectric element 34 of the discharge head 3*w* is driven by this drive signal S. Particularly, when the discharge head 3*w* is caused to discharge the white ink to print the background image Ib as described above, it is determined to give the drive signal S1 to each piezoelectric element 34 of the discharge head 3*w***. That is, the background image Ib is printed by discharging the white ink droplets in the quantity Q1*w*. Further, two discharge heads **3*w* for discharging the white ink are provided. Accordingly, the head control unit 95 generates the drive signal S1 for each of the two discharge heads 3*w* from the halftone image data Dhw and gives the generated drive signal S1 to the piezoelectric elements 34 of each discharge head 3*w*. In this way, the two discharge heads 3*w*** share the printing of the white background image Ib represented by the halftone image data Dhw.

Figure 5:
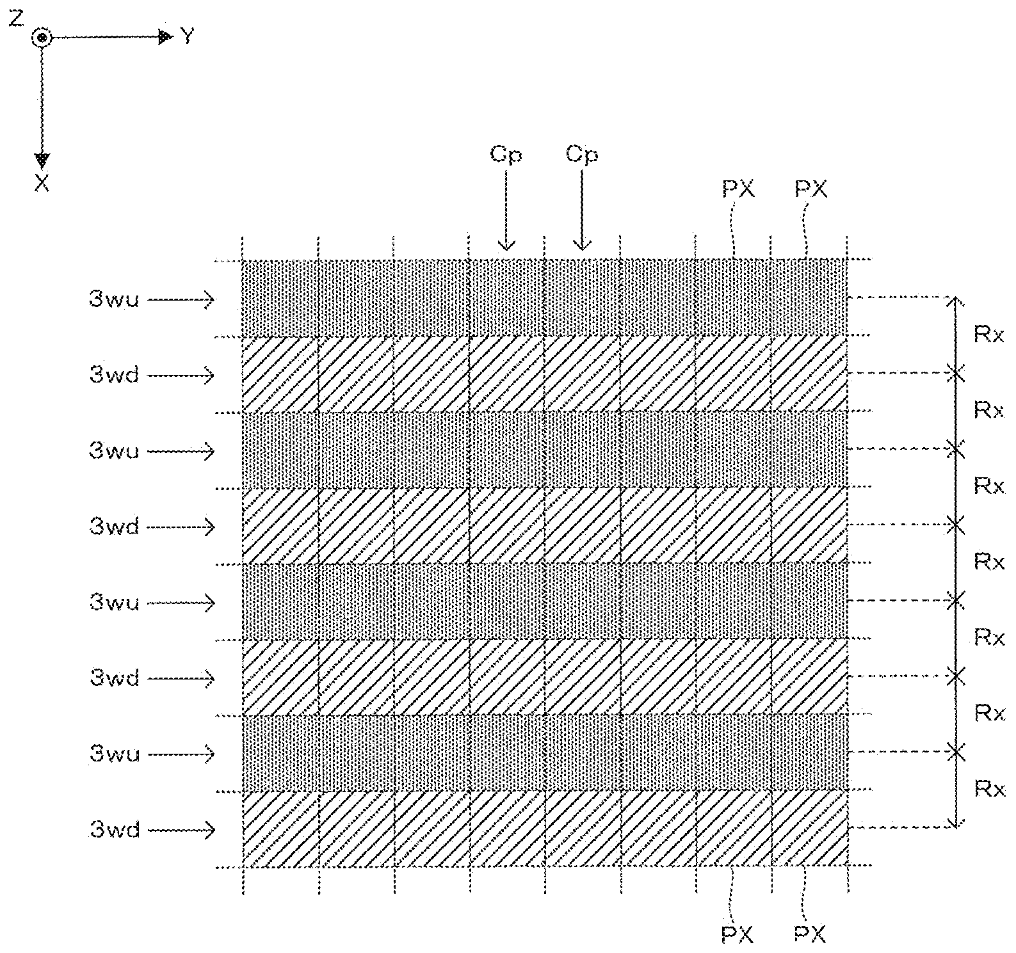
FIG. 5 is a plan view schematically showing a first example of ranges in which each of the two discharge heads for discharging the white ink discharges the ink.
Figure 6:
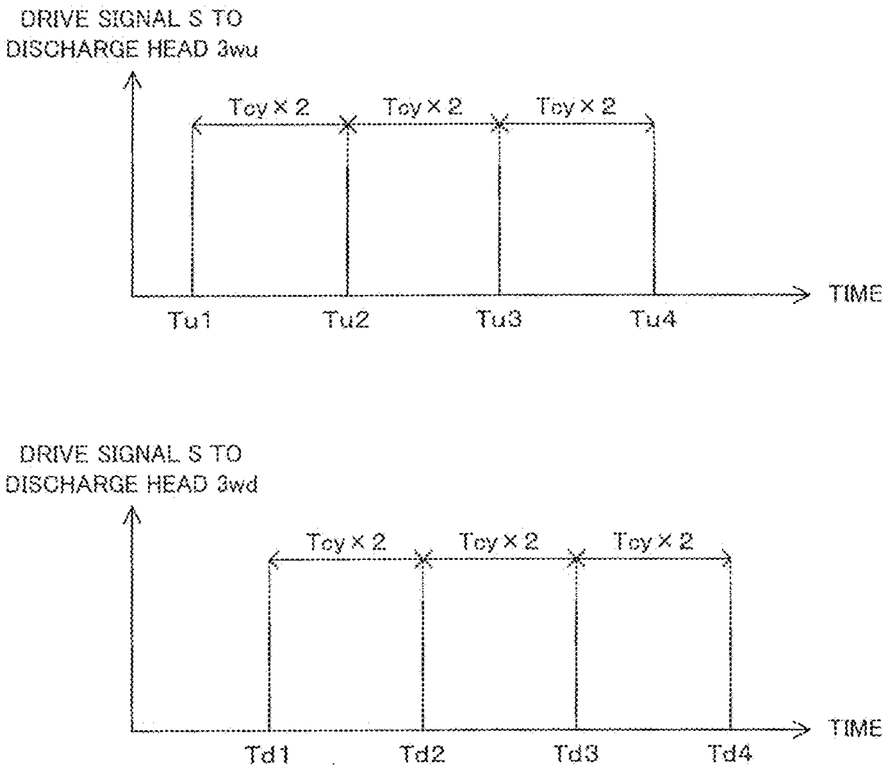
FIG. 6 is timing charts schematically showing timings at which the drive signals are given to the two discharge heads for discharging the white ink to perform an operation of FIG. 5.

This point is described using FIGS. 5 and 6. FIG. 5 is a plan view schematically showing a first example of ranges in which each of the two discharge heads for discharging the white ink discharges the ink, and FIG. 6 is timing charts schematically showing timings at which the drive signals are given to the two discharge heads for discharging the white ink to perform an operation of FIG. 5. Here, the discharge head **3*w* on an upstream side and the discharge head 3*w* on a downstream side in the X direction, out the two discharge heads 3*w*, are appropriately distinguished as the discharge head 3*wu* and the discharge head 3*wd***.

As shown in FIG. 5, a plurality of pixels PX arrayed in a matrix in the X and Y directions is set for the web 10. In the Y direction, the pixels PX are arrayed at an array pitch of the nozzles 31 of the discharge head **3*w*. In the X direction, the pixels PX are arrayed at an array pitch Rx corresponding to a resolution of an image. The nozzles 31 of the discharge head 3*w* discharges the ink droplets to the pixels PX provided at the same positions as the nozzles 31 in the Y direction. That is, the nozzle 31 discharge the ink droplets to a pixel row Cp formed of the pixels PX arrayed in parallel to the X direction. Further, the nozzle 31 of the discharge head 3*wu* and the nozzle 31 of the discharge head 3*wd* provided at the same position in the Y direction discharge the ink droplets to the pixel row Cp provided at the same position as the respective nozzles 31** in the Y direction.

At this time, the nozzle 31 of the discharge head **3*wu* and the nozzle 31 of the discharge head 3*wd* discharge the ink droplets to mutually different pixels PX in one pixel row Cp, thereby sharing the discharge of the ink droplets to the pixel row Cp. That is, as shown in FIG. 5, in the pixel row Cp, the pixels PX (dot hatched pixels PX), to which the ink droplets are discharged by the discharge head 3*wu*, and the pixels PX (obliquely hatched pixels PX), to which the ink droplets are discharged by the discharge head 3*wd***, are alternately arranged one by one in the X direction.

To perform such sharing, the drive signal S is given to the nozzles 31 of each discharge head **3*wu*, 3*wd* at timings shown in the timing chart of FIG. 6. Here, a cycle Tcy shown in FIG. 6 is a value obtained by dividing the array pitch Rx of the pixels PX in the X direction by the conveying speed V and equivalent to a time required to move the web 10 by the array pitch Rx in the X direction. The discharge of the ink droplets from each nozzle 31 of the discharge head 3*k*, 3*c*, 3*m*, 3*y* other than the discharge heads 3*w* is performed in synchronization with the cycle Tcy. In contrast, the discharge of the ink droplets from the discharge heads 3*wu*, 3*wd*** is performed in synchronization with a cycle that is twice the cycle Tcy.

That is, the following operation is repeated. The drive signal S1 is given to the nozzle 31 of the discharge head **3*wu* at time Tu1, and the nozzle 31 discharges the white ink in the quantity Q1***w*. At time Tu2 after the elapse of a cycle, which is twice the cycle Tcy, from time Tu1, the drive signal S1 is given to the nozzle 31 of the discharge head **3*wu* and the nozzle 31 discharges the white ink in the quantity Q1***w*. At time Tu3 after the elapse of the cycle, which is twice the cycle Tcy, from time Tu2, the drive signal S1 is given to the nozzle 31 of the discharge head **3*wu* and the nozzle 31 discharges the white ink in the quantity Q1***w*.

Similarly, the following operation is repeated. The drive signal S1 is given to the nozzle 31 of the discharge head **3*wd* at time Td1, and the nozzle 31** discharges the white ink in the quantity Q1*w*. At time Td2 after the elapse of the cycle, which is twice the cycle Tcy, from time Td1, the drive signal S1 is given to the nozzle 31 of the discharge head 3*wd* and the nozzle 31 discharges the white ink in the quantity Q1*w*. At time Td3 after the elapse of the cycle, which is twice the cycle Tcy, from time Td2, the drive signal S1 is given to the nozzle 31 of the discharge head 3*wd* and the nozzle 31 discharges the quantity Q1*w* of the white ink.

In this way, ink dots discharged from the discharge head 3*wu* and ink dots discharged from the discharge head 3*wd* are alternately arranged one by one in the X direction on the web 10 according to the operation shown in FIG. 5. Further, in the Y direction, the ink dots discharged from the plurality of nozzles 31 of the discharge head 3*wu* are arranged in a row on the web 10, and the ink dots discharged from the plurality of nozzles 31 of the discharge head 3*wd* are arranged in a row on the web 10. That is, ranges in which the discharge head 3*wu* discharges the ink and ranges in which the discharge head 3*wd* discharges the ink are arranged in an interlaced manner.

In the embodiment described above, each of the discharge head 3*wu* (second discharge unit) for discharging the ink from the nozzles 31 (second nozzles) and the discharge head 3*wd* (third discharge unit) for discharging the ink from the nozzles 31 (third nozzles) discharges the ink dots of white (specific color) to the web 10. Particularly, the discharge heads 3*wu*, 3*wd* are controlled to share the discharge of the white ink for the web 10 as shown in FIG. 5. As a result of such a control, the ink dot discharged to the web 10 from the discharge head 3*wd* is interposed between two ink dots successively discharged to the web 10 from the nozzle 31 of the discharge head 3*wu* in the X direction. Further, the ink dot discharged to the web 10 from the discharge head 3*wu* is interposed between two ink dots successively discharged to the web 10 from the nozzle 31 of the discharge head 3*wd* in the X direction. That is, each of the discharge head 3*wu* and the head 3*wd* only has to be able to continuously discharge the ink in the cycle, which is twice the cycle Tcy, and should not necessarily be able to continuously discharge the ink in a short time (cycle Tcy). As a result, a large quantity of the white ink can be discharged to the web 10 without requiring the high-performance discharge heads 3*w* (discharge unit).

Further, the controller 9 (control unit) controls the timing at which the discharge head 3*k*, 3*c*, 3*m* or 3*y* (first discharge unit) discharge the ink so that the color ink is discharged to the web 10 at a predetermined resolution (resolution corresponding to the array pitch Rx) in the X direction (conveying direction). Further, the controller 9 controls the timing at which each of the discharge head 3*wu* and the discharge head 3*wd* discharge the ink so that the white ink is discharged to the web 10 at the resolution (resolution corresponding to the array pitch Rx) in the X direction. In such a configuration, the ink discharge timings by the discharge head 3*k*, 3*c*, 3*m* or 3*y* and the ink discharge timings by the discharge head 3*wu*, 3*wd* can be controlled based on the same resolution (resolution corresponding to the array pitch Rx). Specifically, the rasterizing and halftone processing described above can be performed at the common resolution for color (black, cyan, magenta, yellow) and white. Thus, a load of the controller 9 required to control the ink discharge timings can be reduced.

Further, a maximum value Q1*w* of the ink quantity per one ink dot discharged from the nozzle 31 of the discharge head 3*wu*, 3*wd* is larger than a maximum value Qlc of the ink quantity per one ink dot discharged from the nozzle 31 of the discharge head 3*k*, 3*c*, 3*m*, 3*y* (first discharge unit). In such a configuration, a large quantity of the white ink can be discharged to the web 10 by causing the nozzles 31 of each of the discharge heads 3*wu*, 3*wd* to discharge the white ink in the maximum quantity Q1*w* per one ink dot.

Particularly, in patent literature 1 (JP5754537), the quantity of the white ink discharged to the web 10 was ensured by discharging the white ink at a higher resolution than the color inks. Thus, it was required to perform an image processing at different resolutions to complicate a control, and a data quantity for controlling the discharge of the white ink was large, and a load required for the control unit was large. In contrast, as described above, a large quantity of the white ink can be discharged to the web 10 while the load of the controller 9 for controlling the discharge of the inks is reduced by setting the maximum value Q1*w* of the quantity of the ink discharged from the nozzle 31 by the discharge head 3*wu*, 3*wd* larger than the maximum value Qlc of the quantity of the ink discharged from the nozzle 31 by the discharge head 3*k*, 3*c*, 3*m*, 3*y* (first discharge unit).

Further, the controller 9 controls the timing at which each of the discharge heads 3*wu* and discharge head 3*wd* discharges the ink so that the ink dot discharged from the nozzle 31 of the discharge head 3*wu* and the ink dot discharged from the nozzle 31 of the discharge head 3*wd* are alternately arranged in the X direction on the web 10. In such a configuration, a large quantity of the white ink can be discharged to the web 10 without requiring the high-performance discharge heads 3*w*.

Figure 7:
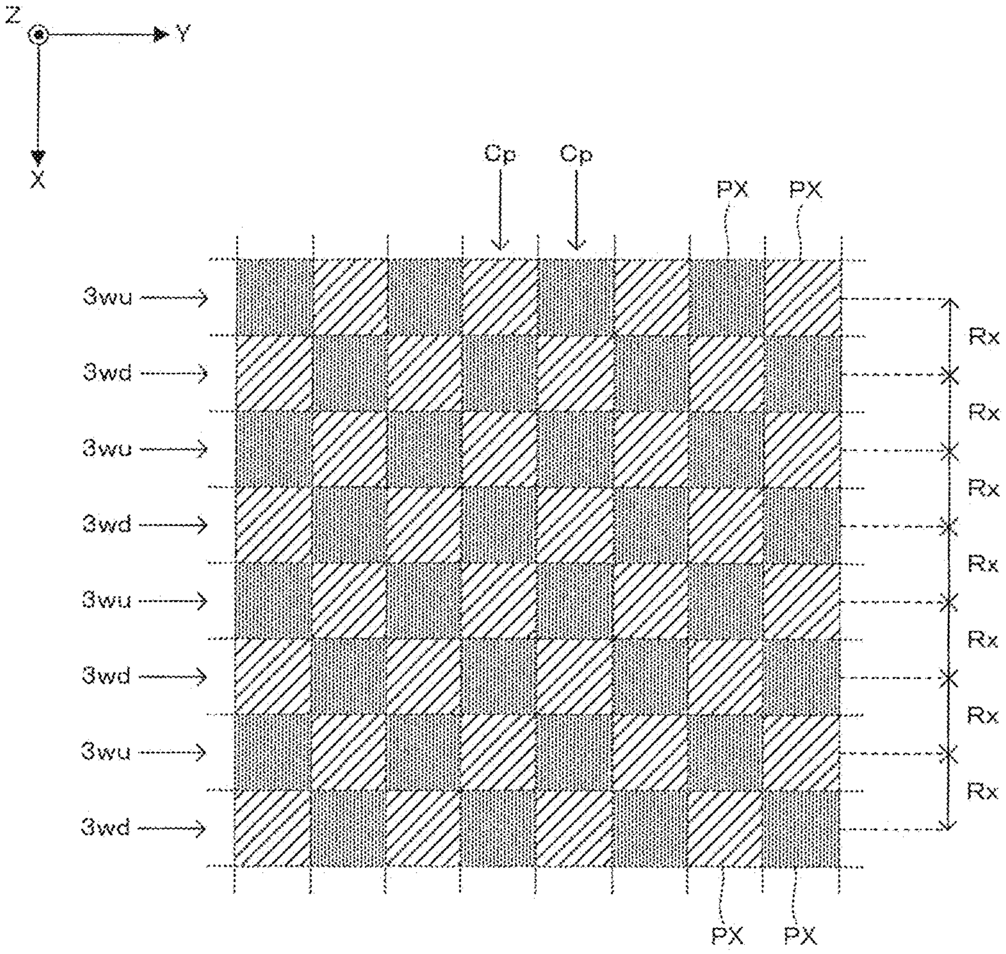
FIG. 7 is a plan view schematically showing a second example of ranges in which each of the two discharge heads for discharging the white ink discharges the ink.

FIG. 7 is a plan view schematically showing a second example of ranges in which each of the two discharge heads for discharging the white ink discharges the ink. Also in the second example of FIG. 7, the pixels PX (dot hatched pixels PX), to which the ink droplets are discharged by the discharge head 3*wu*, and the pixels PX (obliquely hatched pixels PX), to which the ink droplets are discharged by the discharge head 3*wd*, are alternately arranged one by one in the X direction in the pixel row Cp as in the first example of FIG. 5. However, the array phases of the pixels PX, to which the ink droplets are discharged by the discharge head 3*wu*, and the pixels PX, to which the ink droplets are discharged by the discharge head 3*wd*, are different by 1800 between adjacent pixel rows Cp. The second example differs from the first example of FIG. 5 only in such array phases and is the same as the first example of FIG. 5 in other points.

In this way, the ink dots discharged from the discharge head 3*wu* and the ink dots discharged from the discharge head 3*wd* are alternately arranged one by one in the X direction on the web 10 according to an operation shown in FIG. 7. Further, the ink dots discharged from the discharge head 3*wu* and the ink dots discharged from the discharge head 3*wd* are alternately arranged one by one in the Y direction on the web 10. That is, ranges in which the discharge head 3*wu* discharges the ink and ranges in which the discharge head 3*wd* discharges the ink are arranged in a checkered pattern.

Also in the embodiment described above, each of the discharge head 3*wu* (second discharge unit) for discharging the ink from the nozzles 31 (second nozzles) and the discharge head 3*wd* (third discharge unit) for discharging the ink from the nozzles 31 (third nozzles) discharges the ink dots of white (specific color) to the web 10. Particularly, the discharge head 3*wu* and the discharge head 3*wd* are controlled to share the discharge of the white ink to the web 10 as shown in FIG. 7. As a result of such a control, the ink dot discharged to the web 10 from the discharge head 3*wd* is interposed between two ink dots successively discharged to the web 10 from the nozzle 31 of the discharge head 3*wu* in the X direction. Further, the ink dot discharged to the web 10 from the discharge head 3*wu* is interposed between two ink dots successively discharged to the web 10 from the nozzle 31 of the discharge head 3*wd* in the X direction. That is, each of the discharge head 3*wu* and the discharge head 3*wd* only has to be able to continuously discharge the ink in the cycle, which is twice the cycle Tcy, and should not necessarily be able to continuously discharge the ink in a short time (cycle Tcy). As a result, a large quantity of the white ink can be discharged to the web 10 without requiring the high-performance discharge head 3*w* (discharge unit).

Further, since each of the discharge head 3*wu* and the discharge head 3*wd* only has to discharge the white ink at a long interval, the following advantage is also obtained. That is, to properly discharge the ink from the nozzle 31 in the ink-jet method, the stability of a meniscus formed on an interface between the ink and air in the nozzle 31 is important. However, after the ink is discharged, residual vibration is generated in the meniscus. Accordingly, it is required to discharge the ink after the residual vibration of the meniscus is settled. Particularly, such a residual vibration is large in the white ink and it takes a long time until the residual vibration is settled. In contrast, since a discharge interval of the white ink can be set to be long in the above embodiment, the white ink can be stably discharged with the residual vibration settled.

Further, the controller 9 controls the timing at which each of the discharge head 3*wu* and the discharge head 3*wd* so that the ink dot discharged from the nozzle 31 of the discharge head 3*wu* and ink dot discharged from the nozzle 31 of the discharge head 3*wd* are alternately arranged in the X direction on the web 10. In such a configuration, a large quantity of the white ink can be discharged to the web 10 without requiring the high-performance discharge heads 3*w*.

If the maximum value Q1*w* of the ink quantity per one ink dot discharged by the discharge head 3*wu*, 3*wd* is set to be larger than the maximum value Qlc of the ink quantity per one ink dot discharged by the discharge head 3*k*, 3*c*, 3*m*, 3*y*, the following situation possibly occurs. That is, if a predetermined target image including white, specifically, a line constituting a line image (ruled line or the like) or a character (alphabet, Chinese character or the like), is thicker than a predetermined width, a scene in which this line is printed by each of the discharge heads 3*wu*, 3*wd* discharging the ink in the maximum quantity Q1*w* is considered. However, since the maximum value Q1*w* of the ink discharge quantity of each discharge head 3*wu*, 3*wd* is set to be large, the line constituting the target image possibly becomes too thick. Accordingly, the following target image correction control shown in FIG. 8 or 9 may be performed.

Figure 8:
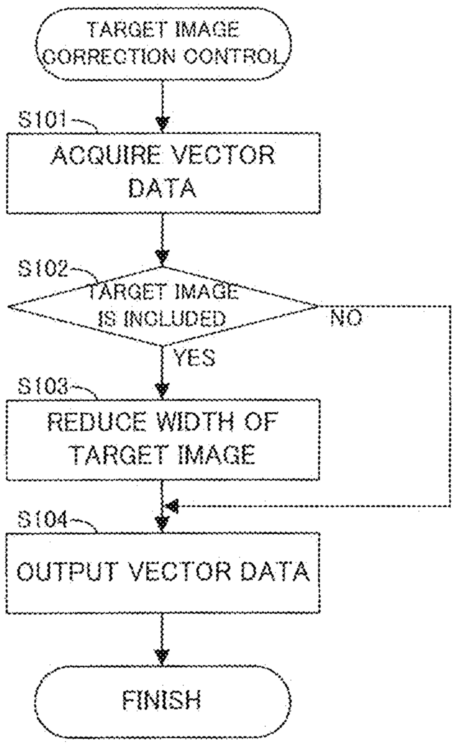
FIG. 8 is a flow chart showing a first example of the target image correction control.

FIG. 8 is a flow chart showing a first example of the target image correction control. The target image correction control of FIG. 8 is performed by the data acquisitor 92 of the controller 9. That is, if acquiring vector data Dv (Step S101), the data acquisitor 92 determines whether or not a target image (line image or character) is included in a white image represented by the vector data Dv (Step S102). If the target image is not included ("NO" in Step S102), the data acquisitor 92 outputs the acquired vector data Dv to the RIP 93 (Step S104). As a result, the RIP 93 rasterizes the vector data Dv.

If the target image (line image or character) is included in the white image represented by the vector data Dv ("YES" in Step S102), the data acquisitor 92 corrects the vector data Dv by applying an image processing of reducing a width of a line constituting the target image to the vector data Dv (Step S103). Then, the data acquisitor 92 outputs the vector data Dv corrected in Step S103 to the RIP 93. As a result, the RIP 93 rasterizes the corrected vector data Dv. Subsequent processings by the halftone processor 94 and the head control unit 95 are as described above.

That is, the controller 9 generates, from the vector data Dv, drive signals S (first control signals) for controlling the ink discharge from the nozzles 31 of the discharge head 3*k*, 3*c*, 3*m*, 3*y* (first discharge unit), drive signals S (second control signals) for controlling the ink discharge from the nozzles 31 (second nozzles) of the discharge head 3*wu* (second discharge unit) and drive signals S (third control signals) for controlling the ink discharge from the nozzles 31 (third nozzles) of the discharge head 3*wd* (third discharge unit). Further, the controller 9 generates drive signals S for the discharge heads 3*wu*, 3*wd* by performing the processing (ink quantity adjustment processing) of Step S103 to reduce the quantity of the ink to be discharged for a target image including at least one of a line image or a character to be formed by the white ink, out of the image represented by the vector data Dv. In this way, it can be suppressed that the line constituting the target image becomes too thick.

Specifically, the controller 9 performs an image processing of thinning the width of the target image represented by the vector data Dv (Step S103). In this way, it can be suppressed that the line constituting the target image becomes too thick.

Figure 9:
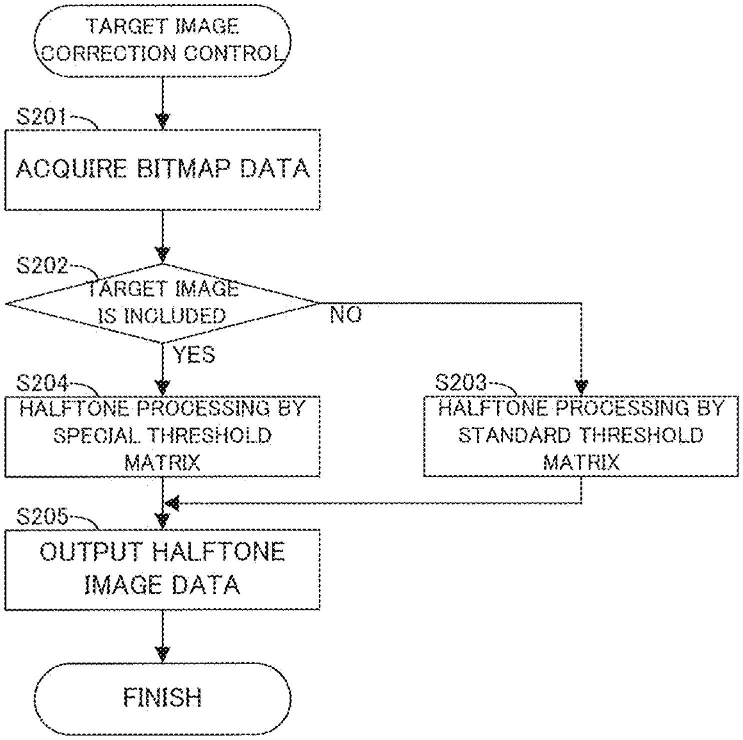
FIG. 9 is a flow chart showing a second example of the target image correction control.

FIG. 9 is a flow chart showing a second example of the target image correction control. The target image correction control of FIG. 9 is performed by the halftone processor 94 of the controller 9. That is, if acquiring white bit map data Dbw (Step S201), the halftone processor 94 determines whether or not a target image (line image or character) is included in a white image represented by the bit map data Dbw (Step S202). If the target image is not included ("NO" in Step S202), the halftone processor 94 generates halftone image data Dhw by applying the halftone processing by a standard threshold matrix to the acquired bit map data Dbw (Step S203). This halftone processing is the same as the one described above. Then, this halftone image data Dhw is output to the head control unit 95 (Step S205).

If the target image (line image or character) is included in the white image represented by the bit map data Dbw ("YES" in Step S202), the halftone processor 94 generates the halftone image data Dhw by applying the halftone processing by a special threshold matrix to the acquired bit map data Dbw (Step S204). This special threshold matrix limits a range to which the ink is discharged for the target image more than the standard threshold matrix. That is, the range to which the ink is discharged for the target image in the halftone image data Dhw obtained by applying the halftone processing by the special threshold matrix to the bit map data Dbw is more limited than the range to which the ink is discharged for the target image in the halftone image data Dhw obtained by applying the halftone processing by the standard threshold matrix to the bit map data Dbw. Then, this halftone image data Dhw is output to the head control unit 95 (Step S205).

That is, the controller 9 generates, from the bit map data Dbk, Dbc, Dbm, Dby and Dbw (image data), drive signals S (first control signals) for controlling the ink discharge from the nozzles 31 of the discharge head 3*k*, 3*c*, 3*m*, 3*y* (first discharge unit), drive signals S (second control signals) for controlling the ink discharge from the nozzles 31 (second nozzles) of the discharge head 3*wu* (second discharge unit) and drive signals S (third control signals) for controlling the ink discharge from the nozzles 31 (third nozzles) of the discharge head 3*wd* (third discharge unit). Further, the controller 9 generates drive signals S for the discharge heads 3*wu*, 3*wd* by performing the processing (ink quantity adjustment processing) of Step S204 to reduce the quantity of the ink to be discharged for a target image including at least one of a line image or a character to be formed by the white ink, out of the image represented by the bit map data Dbw. In this way, it can be suppressed that the line constituting the target image becomes too thick.

Specifically, the controller 9 performs an image processing of limiting the range to which the ink is discharged in the target image by applying the halftone processing to the target image represented by bit map data Dbw (Step S204). In this way, it can be suppressed that the line constituting the target image becomes too thick.

In the embodiment described above, the printing apparatus 1 corresponds to an example of a "printing apparatus" of the invention, the web 10 corresponds to an example of a "printing medium" of the invention, the conveyor 2 corresponds to an example of a "conveyor" of the invention, each of the discharge heads 3*k*, 3*c*, 3*m* and 3*y* corresponds to an example of a "first discharge unit" of the invention, the nozzle 31 of each of the discharge heads 3*k*, 3*c*, 3*m* and 3*y* corresponds to an example of a "first nozzle" of the invention, the discharge head 3*wu* corresponds to an example of a "second discharge unit" of the invention, the nozzle 31 of the discharge head 3*wu* corresponds to an example of a "second nozzle" of the invention, the discharge head 3*wd* corresponds to an example of a "third discharge unit" of the invention, the nozzle 31 of the discharge head 3*wd* corresponds to an example of a "third nozzle" of the invention, the controller 9 corresponds to an example of a "control unit" of the invention, the drive signal S for each of the discharge heads 3*k*, 3*c*, 3*m* and 3*y* corresponds to an example of a "first control signal" of the invention, the drive signal S for the discharge head 3*wu* corresponds to an example of a "second control signal" of the invention, the drive signal S for the discharge head 3*wd* corresponds to an example of a "third control signal" of the invention, the X direction corresponds to an example of a "conveying direction" of the invention, and the Y direction corresponds to an example of an "array direction" of the invention.

Note that the invention is not limited to the above embodiment and various changes other than the aforementioned ones can be made without departing from the gist of the invention. For example, out of inequalities relating to the discharge quantity of the white ink shown in the above example, Qsc<Qsw and Qmc<Qmw may not be satisfied. That is, the quantities Qsc and Qsw may be set to be nearly equal or the quantities Qmc and Qmw may be set to be nearly equal. Specifically, such a setting is possible by adjusting amplitudes of the drive signals Ss, Sm to be given to the discharge heads 3*w*.

A volume of the cavity 32 of the discharge head 3*w* and that of the cavity 32 of the discharge head 3*k*, 3*c*, 3*m*, 3*y* may be equal. In this case, a control may be executed to satisfy the inequality Q1*c*<Q1*w* by adjusting an amplitude of the drive signal S1 to be given to the discharge heads 3*w*.

Further, the color (specific color) of the background image Ib is not limited to white, but may be a color other than white.

Further, the number of the discharge heads 3*w* for discharging the white ink is not limited to two, but may be three or more.

Further, the number of the discharge heads 3 for discharging the color inks is not limited to four as described above, but may be one or more.

Further, the mechanism for discharging the ink by the ink-jet method is not limited to the mechanism by the piezoelectric elements 34 described above, but may be a mechanism for discharging the ink by heating.

The invention is applicable to techniques in general for printing an image on a printing medium by discharging an ink from nozzles by the ink-jet method.

As described above, the printing apparatus may be configured so that the control unit controls a timing at which the first discharge unit discharges the ink so that the ink of the color different from the specific color is discharged at a predetermined resolution to the printing medium in the conveying direction, and the control unit controls a timing at which each of the second discharge unit and the third discharge unit so that the ink of the specific color is discharged at the resolution to the printing medium in the conveying direction. In such a configuration, a timing at which the first discharge unit discharges ink and a timing at which the second and third discharge units discharge ink can be controlled based on the same resolution. Thus, a load of the control unit required to control the ink discharge timings can be reduced.

The printing apparatus may be configured so that a maximum value of a quantity of the ink per one ink dot discharged from the second nozzle by the second discharge unit and a maximum value of a quantity of the ink per one ink dot discharged from the third nozzle by the third discharge unit are larger than a maximum value of a quantity of the ink per one ink dot discharged from the first nozzle by the first discharge unit. In such a configuration, a large quantity of the ink of the specific color can be discharged to the printing medium by causing each of the second and third nozzles to discharge the ink in a maximum quantity.

Particularly, in patent literature 1 (JP5754537), the quantity of the white ink discharged to the printing medium was ensured by discharging the white ink at a higher resolution than the color inks. Thus, it was required to perform an image processing at different resolutions to complicate a control, a data quantity for controlling the discharge of the white ink was large, and a load required for the control unit was large. In contrast, a large quantity of the ink of the specific color can be discharged to the printing medium while a load of the control unit for controlling the discharge of the ink is reduced by setting the maximum values of the ink quantity per one ink dot discharged by the second and third discharge units larger than the maximum value of the ink quantity per one ink dot discharged by the first discharge unit as described above.

If the maximum values of the ink quantity per one ink dot discharged from the second and third discharge units are set larger than the maximum value of the ink quantity per one ink dot discharged by the first discharge unit, the following situation possibly occurs. That is, if a predetermined target image including the specific color, specifically, a line constituting a line image or a character is thicker than a predetermined width, a scene in which this line is printed by each of the second and third discharge units discharging the maximum quantity of the ink is considered. However, since the maximum value of the ink discharge quantity of each of the second and third discharge units is set to be large, the line constituting the target image possibly becomes too thick.

Therefore, the printing apparatus may be configured so that the control unit generates a first control signal for controlling ink discharge from the first nozzles of the first discharge unit, a second control signal for controlling ink discharge from the second nozzles of the second discharge unit and a third control signal for controlling ink discharge from the third nozzles of the third discharge unit from image data representing an image to be printed on the printing medium, the first discharge unit discharges the ink from the first nozzles at a timing indicated by the first control signal, the second discharge unit discharges the ink from the second nozzles at a timing indicated by the second control signal, the third discharge unit discharges the ink from the third nozzles at a timing indicated by the third control signal, and the control unit generates the second control signal and the third control signal by performing an ink quantity adjustment processing to reduce the quantity of the ink per one ink dot discharged for a target image including at least one of a line image and a character to be formed by the ink of the specific color, out of the image represented by image data. In this way, it can be suppressed that the line constituting the target image becomes too thick.

Specifically, the printing apparatus may be configured so that the control unit performs, as the ink quantity adjustment processing, an image processing of thinning a width of the target image represented by the image data. The printing apparatus may be configured so that the control unit performs, as the ink quantity adjustment processing, an image processing of limiting a range to which the ink is discharged in the target image by applying a halftone processing to the target image represented by the image data. In such a configuration, it can be suppressed that the line constituting the target image becomes too thick.

The printing apparatus may be configured so that the control unit controls a timing at which each of the second discharge unit and the third discharge unit discharges the ink so that ink dot formed on the printing medium by the ink discharged from the second nozzle and ink dot formed on the printing medium by the ink discharged from the third nozzle are alternately arranged in the conveying direction on the printing medium. In such a configuration, a large quantity of the ink of the specific color can be discharged to the printing medium without requiring a high-performance discharge unit.

Further, various modes in the array direction of the ink dots formed on the printing medium by the ink discharged from the second and third nozzles are supposed. That is, the printing apparatus may be configured so that the control unit controls the timing at which each of the second discharge unit and the third discharge unit discharges the ink so that the ink dot formed on the printing medium by the ink discharged from the second nozzles and the ink dot formed on the printing medium by the ink discharged from the third nozzle are alternately arranged in the array direction on the printing medium. The printing apparatus may be configured so that the control unit controls the timing at which each of the second discharge unit and the third discharge unit discharge the ink so that the ink dots formed on the printing medium by the ink discharged from the mutually different second nozzles are arranged in a row in the array direction and the ink dots formed on the printing medium by the ink discharged from the mutually different third nozzles are arranged in a row in the array direction.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printing apparatus, comprising:

a conveyor conveying a printing medium in a conveying direction;

a first discharge unit including a plurality of first nozzles arrayed at a predetermined array pitch in an array direction intersecting the conveying direction, the first discharge unit forming an ink dot on the printing medium by an ink discharged from the first nozzle;

a second discharge unit including a plurality of second nozzles arrayed at the array pitch in the array direction, the second discharge unit forming an ink dot on the printing medium by an ink discharged from the second nozzle;

a third discharge unit including a plurality of third nozzles arrayed at the array pitch in the array direction, the third discharge unit forming an ink dot on the printing medium by an ink discharged from the third nozzle; and a control unit controlling the first discharge unit, the second discharge unit and the third discharge unit, the first discharge unit, the second discharge unit and the third discharge unit being arrayed in the conveying direction, a color of the ink discharged from the second nozzles by the second discharge unit and a color of the ink discharged from the third nozzles by the third discharge unit being the same specific color, a color of the ink discharged from the first nozzles by the first discharge unit being a color different from the specific color, the control unit controlling a timing at which each of the second discharge unit and the third discharge unit discharges an ink droplet so that one ink dot formed on the printing medium by the ink discharged from the third nozzle is interposed between two ink dots formed on the printing medium by the ink continuously discharged from the second nozzle and one ink dot formed on the printing medium by the ink discharged from the second nozzle is interposed between two ink dots formed on the printing medium by the ink discharged from the third nozzle in the conveying direction, and the second nozzle and the third nozzle discharging ink droplets to mutually different pixels in a same pixel row formed of pixels arrayed in parallel to the conveying direction thereby sharing discharge of the ink droplets to the same pixel row.

2. The printing apparatus according to claim 1, wherein:

the control unit controls a timing at which the first discharge unit discharges the ink so that the ink of the color different from the specific color is discharged at a predetermined resolution to the printing medium in the conveying direction, and the control unit controls a timing at which each of the second discharge unit and the third discharge unit so that the ink of the specific color is discharged at the resolution to the printing medium in the conveying direction.

3. The printing apparatus according to claim 2, wherein a maximum value of a quantity of the ink per one ink dot discharged from the second nozzle by the second discharge unit and a maximum value of a quantity of the ink per one ink dot discharged from the third nozzle by the third discharge unit are larger than a maximum value of a quantity of the ink per one ink dot discharged from the first nozzle by the first discharge unit.

4. The printing apparatus according to claim 3, wherein:

the control unit generates a first control signal for controlling ink discharge from the first nozzles of the first discharge unit, a second control signal for controlling ink discharge from the second nozzles of the second discharge unit and a third control signal for controlling ink discharge from the third nozzles of the third discharge unit from image data representing an image to be printed on the printing medium, the first discharge unit discharges the ink from the first nozzles at a timing indicated by the first control signal, the second discharge unit discharges the ink from the second nozzles at a timing indicated by the second control signal, the third discharge unit discharges the ink from the third nozzles at a timing indicated by the third control signal, and the control unit generates the second control signal and the third control signal by performing an ink quantity adjustment processing to reduce the quantity of the ink per one ink dot discharged for a target image including at least one of a line image and a character to be formed by the ink of the specific color, out of the image represented by image data.

5. The printing apparatus according to claim 4, wherein:

the control unit performs, as the ink quantity adjustment processing, an image processing of thinning a width of the target image represented by the image data.

6. The printing apparatus according to claim 4, wherein:

the control unit performs, as the ink quantity adjustment processing, an image processing of limiting a range to which the ink is discharged in the target image by applying a halftone processing to the target image represented by the image data.

7. The printing apparatus according to claim 1, wherein:

the control unit controls a timing at which each of the second discharge unit and the third discharge unit discharges the ink so that ink dot formed on the printing medium by the ink discharged from the second nozzle and ink dot formed on the printing medium by the ink discharged from the third nozzle are alternately arranged in the conveying direction on the printing medium.

8. The printing apparatus according to claim 7, wherein:

the control unit controls the timing at which each of the second discharge unit and the third discharge unit discharges the ink so that the ink dot formed on the printing medium by the ink discharged from the second nozzles and the ink dot formed on the printing medium by the ink discharged from the third nozzle are alternately arranged in the array direction on the printing medium.

9. The printing apparatus according to claim 7, wherein:

the control unit controls the timing at which each of the second discharge unit and the third discharge unit discharge the ink so that the ink dots formed on the printing medium by the ink discharged from the mutually different second nozzles are arranged in a row in the array direction and the ink dots formed on the printing medium by the ink discharged from the mutually different third nozzles are arranged in a row in the array direction.

10. A printing method, comprising:

conveying a printing medium in a conveying direction;

controlling a timing at which an ink is discharged to the printing medium from a first nozzle by a first discharge unit including a plurality of first nozzles arrayed at a predetermined array pitch in an array direction intersecting the conveying direction;

controlling a timing at which an ink is discharged to the printing medium from a second nozzle by a second discharge unit including a plurality of second nozzles arrayed at the predetermined array pitch in the array direction; and controlling a timing at which an ink is discharged to the printing medium from a third nozzle by a third discharge unit including a plurality of third nozzles arrayed at the predetermined array pitch in the array direction;

the first discharge unit, the second discharge unit and the third discharge unit being arrayed in the conveying direction, a color of the ink discharged from the second nozzles by the second discharge unit and a color of the ink discharged from the third nozzles by the third discharge unit being the same specific color, a color of the ink discharged from the first nozzles by the first discharge unit being a color different from the specific color, the timing, at which each of the second discharge unit and the third discharge unit discharges the ink, being controlled so that one ink dot formed on the printing medium by the ink discharged from the third nozzle is interposed between two ink dots formed on the printing medium by the ink continuously discharged from the second nozzle and one ink dot formed on the printing medium by the ink discharged from the second nozzle is interposed between two ink dots formed on the printing medium by the ink continuously discharged from the third nozzle in the conveying direction, and the second nozzle and the third nozzle discharging ink droplets to mutually different pixels in a same pixel row formed of pixels arrayed in parallel to the conveying direction thereby sharing discharge of the ink droplets to the same pixel row.

* * * * *